(12) United States Patent
Matsutani et al.

(10) Patent No.: US 7,651,062 B2
(45) Date of Patent: Jan. 26, 2010

(54) LCD APPARATUS

(75) Inventors: Nobuhiro Matsutani, Daito (JP); Yuya Tanaka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 453 days.

(21) Appl. No.: 11/404,112

(22) Filed: Apr. 14, 2006

(65) Prior Publication Data

US 2007/0097608 A1 May 3, 2007

(30) Foreign Application Priority Data

Apr. 20, 2005 (JP) ............................ 2005-002457

(51) Int. Cl.
*F16M 11/04* (2006.01)
(52) U.S. Cl. .................................. 248/176.3; 248/917
(58) Field of Classification Search ................ 248/371, 248/122.1, 917, 919–923, 176.3, 676, 678; 361/681; 312/7.2, 237; 353/77; 29/897; 439/76.1
See application file for complete search history.

(56) References Cited

U.S. PATENT DOCUMENTS

| | | | | |
|---|---|---|---|---|
| 5,335,142 A * | 8/1994 | Anderson | .................... | 361/681 |
| 5,765,794 A * | 6/1998 | Chen | ...................... | 248/292.12 |
| 5,812,368 A * | 9/1998 | Chen et al. | ................... | 361/681 |
| 6,024,335 A * | 2/2000 | Min | ........................... | 248/371 |
| 6,484,994 B2 * | 11/2002 | Hokugoh | ..................... | 248/371 |
| 6,502,792 B1 * | 1/2003 | Cho et al. | .................... | 248/121 |
| 6,837,469 B2 * | 1/2005 | Wu et al. | .................. | 248/278.1 |
| 6,905,103 B2 * | 6/2005 | Kim | ........................... | 248/398 |
| 6,954,221 B2 * | 10/2005 | Wu | ............................ | 361/681 |
| 7,177,144 B2 * | 2/2007 | Ha et al. | ...................... | 361/681 |
| 7,193,843 B2 * | 3/2007 | Hsu | ........................... | 361/681 |
| 2002/0130981 A1 * | 9/2002 | Ma et al. | ..................... | 348/843 |
| 2002/0180661 A1 * | 12/2002 | An | .................................. | 345/4 |
| 2003/0103092 A1 * | 6/2003 | Byoun et al. | ................ | 345/866 |
| 2003/0132360 A1 * | 7/2003 | Ju | ............................... | 248/371 |
| 2006/0290832 A1 * | 12/2006 | Lin et al. | ...................... | 349/58 |

FOREIGN PATENT DOCUMENTS

| | | |
|---|---|---|
| JP | 08-289230 | 11/1996 |
| JP | 2003-015542 | 1/2003 |

* cited by examiner

*Primary Examiner*—Korie Chan
(74) *Attorney, Agent, or Firm*—Global IP Counselors, LLP (57) ABSTRACT

To stabilize the weight balance of an entire liquid crystal display device by locating a lateral shaft by which the lower end of a support leg is attached to a base either directly under or substantially directly under the center of gravity of a main unit having a liquid crystal module.

A main unit 1 in which a liquid crystal module 2 is housed in a cabinet 3 is supported so as to allow tilt adjustment, by a support leg 6 that rises up from a base 5. An attachment component 61 of the support leg 6 is overlapped with and fastened by screws on the outer back face of a metal plate 22 of the liquid crystal module 2, the result being that a lateral shaft 7 for attaching the support leg 6 to the base 5 is located directly under the center of gravity G of the main unit 1.

7 Claims, 5 Drawing Sheets

Prior Art

Fig. 5 (b)

Prior Art

LCD APPARATUS

FIELD OF THE INVENTION

The present invention relates to a liquid crystal display device, and more particularly relates to a liquid crystal display device in which a main unit equipped with a liquid crystal module is supported by a support leg rising up from a base.

BACKGROUND INFORMATION

In a typical configuration of a liquid crystal display device used in television receivers and so forth, a liquid crystal module equipped with a liquid crystal panel is housed in a flat cabinet, and a window that exposes the display screen of the liquid crystal panel is provided to the front of the cabinet. With this type of liquid crystal display device, the main unit is sometimes supported by a support leg rising up from a base, and in such cases a configuration in which the support leg is fastened by screws to the outer back face of the cabinet has been employed in the past (see, for example, Patent Document 1). In another proposed configuration, a support leg formed in a U-shape is fitted into the lower part of the cabinet and attached to the side face of the cabinet so as to allow its tilt to be adjusted (see, for example, Patent Document 2).

FIGS. 5A and 5B illustrate another example of a liquid crystal display device. With this liquid crystal display device, a support leg 6 rises straight up from a base 5 (indicated by imaginary lines), and an attachment component 61 formed at the upper end of this support leg 6 is fastened by screws to the outer back face of the cabinet 3 of the main unit 1. 62 is an attachment screw. The lower end of the support leg 6 is attached to the base 5 so as to allow tilt adjustment around the lateral shaft 7, and this tilt adjustment function can be utilized to adjust the main unit 1 so that it is inclined forward or backward, or to adjust it so that it is vertically oriented. The lengthwise width L1 of the base 5 shown in FIG. 5B is set wide enough that the main unit 1 will not fall over when adjusted to a tilted orientation.

With This liquid crystal display device, the main unit 1 comprises a liquid crystal module 2 equipped with a liquid crystal panel 21, and the cabinet 3 that houses this liquid crystal module 2. In addition to the liquid crystal panel 21, the liquid crystal module 2 also includes a backlight unit, a control board, a metal plate 22 that surrounds the back and sides of the liquid crystal panel 21 and prevents electromagnetic interference (EMI), and so forth. The cabinet 3 is divided into a front cover 31 supporting the liquid crystal module 2, and a rear cover 35 attached to this front cover 31, and speakers and so forth (not shown) are attached to the front cover 31. Accordingly, the center of gravity G of this liquid crystal display device is located within the spaced occupied by the heavy liquid crystal module 2 and is shifted forward from the place where the back face of the cabinet 3 is attached to the support leg 6, and a load (weight) F applied to this center of gravity G constantly applies a relatively high forward-falling load to the support leg 6.

Also, with a liquid crystal display device configured as in the example illustrated in FIGS. 5A and 5B, a control board (not shown) is also attached to the back face side of the metal plate 22 of the liquid crystal module 2, and the attachment screws 62 that attach the attachment component 61 of the support leg 6 to the back face of the cabinet 3 reach relatively near this control board. In view of this, the attachment of a ground spring (not shown) as a grounding means has been provided as an extra precaution to prevent static electricity from the support leg 6 or the attachment screws 62 from discharging to the control board and generating an unintended short-circuit.

Patent Document 1: Japanese Laid-Open Patent Application 2003-15542

Patent Document 2: Japanese Laid-Open Patent Application H8-289230

DISCLOSURE OF THE INVENTION

Problems which the Invention is Intended to Solve

Figure 5:
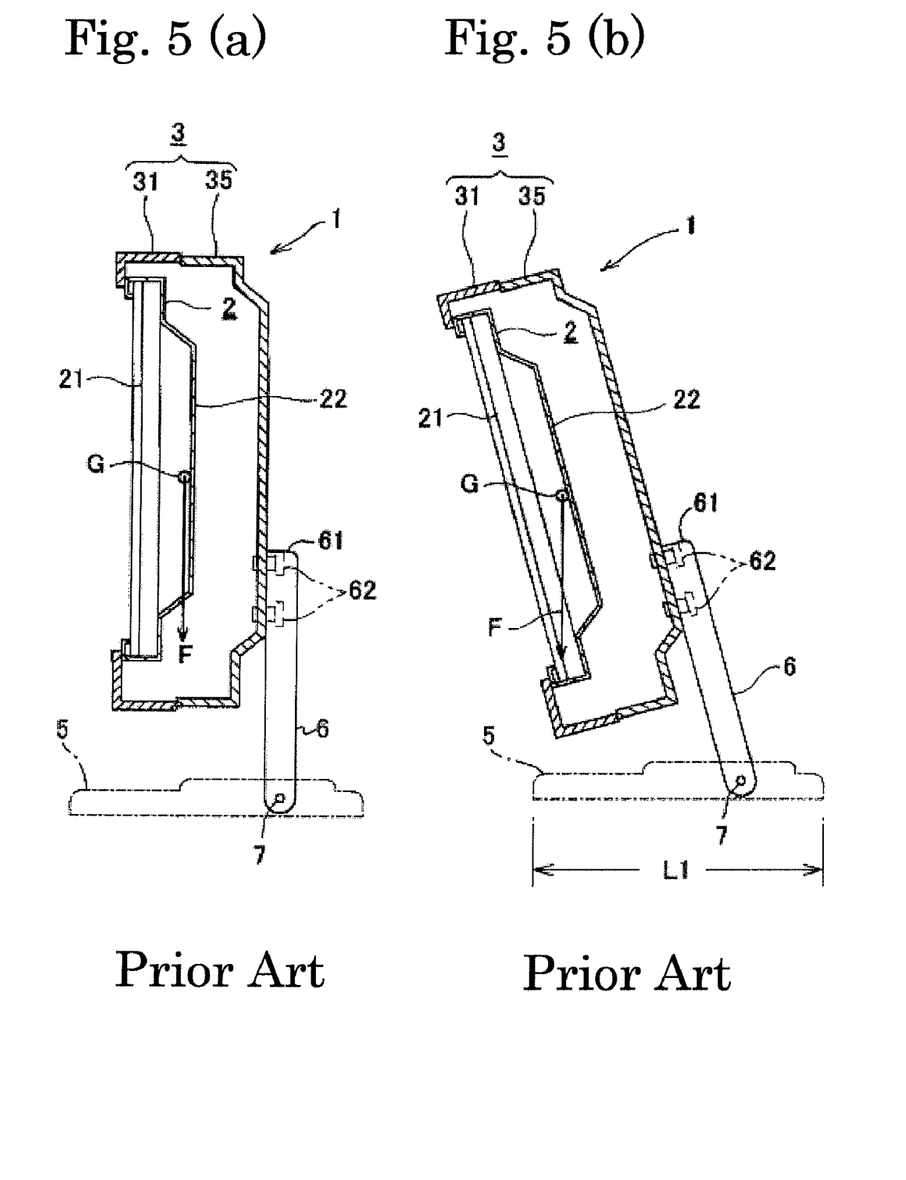
FIG. 5A is a simplified side view illustrating the operation of a conventional liquid crystal display device in a state in which the main unit has been adjusted to a vertical orientation.
FIG. 5B is a simplified side view illustrating the operation in a state in which the main unit has been adjusted to a forward-tilted orientation.

Nevertheless, when, as described through reference to FIG. 5, the center of gravity G of the main unit 1 is located within the space occupied by the liquid crystal module 2, which is shifted forward from the site of attachment of the support leg 6 and the cabinet 3, there is a problem in that if the main unit 1 is swung forward or backward, it tends to keep on swinging, and a problem in that there is the danger of the main unit 1 drooping forward at high temperatures because the cabinet 3 is made of a molded resin or the like. Another problem is that the lengthwise width L1 of the base 5 has to be set wide enough so that the liquid crystal display device will not fall over when the tilt is adjusted and the main unit 1 is angled forward as shown in FIG. 5B, which means that the base 5 has to be that much larger and take up that much more space, and furthermore the packaging and so forth are also larger and transportation costs are higher.

To solve these problems, it might be effective, for example, to bend the support leg 6 in a crank shape and provide a lateral shaft 7 directly under the center of gravity G, but doing this not only results in the support leg 6 being larger, but also drives up the manufacturing cost, and the support leg 6 also increases the overall weight of the liquid crystal display device, which is contrary to the goal of reducing its weight.

With the proposal in the above-mentioned Patent Document 1, the support leg is fastened by screws to the outer back face of the cabinet, and in this respect is the same as the case described through reference to FIG. 5, so the same problems are encountered here again. With the proposal in Patent Document 2, the upper ends of a U-shaped support leg are attached to the side face of the cabinet so that tilt adjustment will be possible, so it is true that forward-falling load is less apt to be applied, but on the other hand a problem is that the lateral width of the support leg is greater, so the support leg ends up being bigger.

The present invention was conceived in an effort to improve the above situation and problems, and it is an object thereof to provide a liquid crystal display device that involves the use of a support leg that is straight in shape, and having the lateral shaft for attaching the lower end of the support leg to the base located directly under or substantially directly under the center of gravity of the main unit. The result of this is that it is possible to provide a liquid crystal display device that ameliorates the problem in that the main unit tends to keep on swinging, the problem in that there is the danger of the main unit drooping forward at high temperatures, the problem in that the lengthwise width of the base has to be set wide, so more installation space is required and transportation costs are higher, and other such problems.

It is another object of the present invention to provide a liquid crystal display device with which the above-mentioned ground spring can be eliminated by employing a configuration that allows the support leg to be brought into contact with the metal plate of the liquid crystal module.

Means Used to Solve the Above-Mentioned Problems

The liquid crystal display device pertaining to the present invention is a liquid crystal display device in which an attachment component of a support leg rising up from a base is attached to the outer back face of a flat cabinet of a main unit in which a liquid crystal module equipped with a liquid crystal panel is housed in said cabinet, and the center of gravity of the main unit is located within the space occupied by the liquid crystal module, wherein the attachment location of the attachment component of the support leg is changed from the outer back face of the cabinet to the outer back face of the liquid crystal module on the inside of the cabinet, which moves this attachment location closer to the center of gravity of the main unit in the horizontal direction, and causes the weight of the liquid crystal module to be borne by the support leg.

With this constitution, because the attachment location of the support leg and the location of the center of gravity of the main unit are closer together in the horizontal direction than with the configuration shown in FIG. 5, less forward-falling load is applied to the support leg or the main unit, so the main unit is less prone to swinging, and there is no danger that the main unit will droop forward at high temperature. Also, since the base is more stably seated, the lengthwise width of the base can be shorter than in the case of FIG. 5, so less installation space is needed, the packaging and so forth can be more compact, and transportation costs can be lowered.

With the present invention, it is preferable if the outer back face of the liquid crystal module corresponds to the outer back face of a metal plate covering the back of the liquid crystal panel, and the attachment component of the support leg, which is straight and made of metal, is overlapped with and fastened by screws to the outer back face of the metal plate. The result of this is that the lateral shaft that supports the support leg is located directly under or substantially directly under the center of gravity of the main unit 1, so less forward-falling load is applied to the support leg or the main unit, and the various effects discussed above are realized, and in addition, since the metal support leg is in contact with the outer back face of the metal plate corresponding to the outer back face of the liquid crystal module, this prevents any static electricity from the support leg or the attachment screws from being discharged to the control board and generating an unintended short-circuit.

With the present invention, it is preferable if the top face of a boss protruding inward from the back wall of the cabinet is overlapped with the attachment component of the support leg, and the attachment component is sandwiched and fastened by screws between the boss and the outer back face of the metal plate. The result of this is that the weight of the main unit borne by the attachment component of the support leg is divided between and borne by the metal plate and the cabinet, which prevents excessive force from being applied to the metal plate and the metal plate deforming as a result.

With the present invention, it is preferable if a sheet made of sheet metal is sandwiched between the attachment component and the outer back face of the metal plate, and the sheet is sandwiched between the attachment component and the outer back face of the metal plate and fastened by screws along with the attachment component. This effectively prevents deformation of the metal plate because the sheet reinforces and holds the shape of the metal plate.

With the present invention, it is also possible to employ a constitution in which the sheet sticks out downward, the top face of another boss protruding inward from the back wall of the cabinet is overlapped with the lower end of this sheet, and the support leg is sandwiched and fastened by screws between this other boss and the sheet. With this constitution, the cabinet is fixed to the support leg at two places, above and below, which stabilizes the attachment state of the cabinet and also makes the main unit less likely to swing.

With the present invention, it is also possible to employ a constitution in which the lower end of the support leg is attached to the base so as to allow adjustment of its tilt around a lateral shaft. With this constitution, the tilt of the main unit can be adjusted.

With the present invention, it is preferable if the base is disposed below the entire region of displacement of the center of gravity in the lengthwise direction accompanying the tilt adjustment, and the lengthwise width of the base is set to be greater than the lengthwise width of the displacement region. With this constitution, the base is more stably seated even when the main unit has been tilted. Also, even if the lengthwise width of the base is set longer than the lengthwise width of the displacement region of the center of gravity location, the attachment site of the support leg and the location of the center of gravity of the main unit will be closer together in the horizontal direction than in the case of FIG. 5, so the lengthwise width of the base can be shorter than what was described in reference to FIG. 5.

The liquid crystal display device pertaining to the present invention is further embodied by employing the following constitution. Specifically, it is embodied by a liquid crystal display device in which an attachment component of a support leg rising up from a base is attached to the outer back face of a flat cabinet of a main unit in which a liquid crystal module equipped with a liquid crystal panel is housed in said cabinet, and the center of gravity of the main unit is located within the space occupied by the liquid crystal module, wherein the outer back face of the liquid crystal module corresponds to the outer back face of a metal plate covering the back of the liquid crystal panel, and the attachment component of the support leg, which is straight and made of metal, is overlapped with and fastened by screws to the outer back face of the metal plate, thereby changing the attachment location of the attachment component of the support leg from the outer back face of the cabinet to the outer back face of the liquid crystal module on the inside of the cabinet and moving this attachment location closer to the center of gravity of the main unit in the horizontal direction, and causing the weight of the liquid crystal module to be borne by the support leg, a sheet made of sheet metal that is fastened by screws to the cabinet is sandwiched between the attachment component and the outer back face of the metal plate, and the top face of a boss protruding inward from the back wall of the cabinet is overlapped with the attachment component of the support leg, and the attachment component and the sheet are sandwiched between the boss and the outer back face of the metal plate and are fastened by screws at two places on the left and right, the sheet sticks out downward, the top face of another boss protruding inward from the back wall of the cabinet is overlapped with the lower end of this sheet, and the support leg is sandwiched between this other boss and the sheet and is fastened by screws at two places on the left and right, and the lower end of the support leg is attached to the base so as to allow adjustment of its tilt around a lateral shaft, the base is disposed below the entire region of displacement of the center of gravity in the lengthwise direction accompanying the tilt adjustment, and the lengthwise width of the base is set to be greater than the lengthwise width of the displacement region. The operation, etc., of the present invention will be described in detail through reference to the embodiments given below.

EFFECT OF THE INVENTION

With the present invention, the support leg is straight in shape, and the lateral shaft for attaching the lower end of the support leg to the base is located directly under or substantially directly under the center of gravity of the main unit, so the weight balance of the entire liquid crystal display device is stabilized, and even if the main unit should swing, this swinging will stop quickly, making the device more convenient to the user, and there is no danger of the main unit drooping forward at high temperatures (in a high-temperature test). Also, since the lengthwise width of the base is shorter and the size is more compact, an advantage is that less installation space is needed, and another advantage is that the packaging is smaller and transportation costs can be kept lower. A further advantage is that since the support leg is in contact with the metal plate of the liquid crystal module, the above-mentioned ground spring can be eliminated and the number of parts reduced, which affords a cost reduction.

KEY 1 main unit
2 liquid crystal module
3 cabinet
5 base
6 support leg
7 lateral shaft
9 sheet
21 liquid crystal panel
22 metal plate
37 boss
37a top face of boss
38 other boss
61 attachment component
G center of gravity of main unit

BEST MODE FOR CARRYING OUT THE INVENTION

Figure 1:
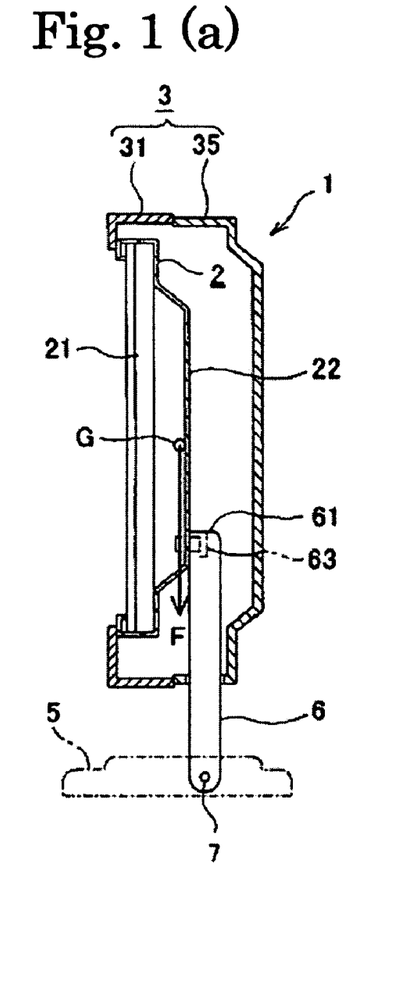
FIG. 1A is a simplified side view illustrating the operation of the liquid crystal display device of the present invention in a state in which the main unit has been adjusted to a vertical orientation.
FIG. 1B is a simplified side view illustrating the operation in a state in which the main unit has been adjusted to a forward-tilted orientation.
Figure 2:
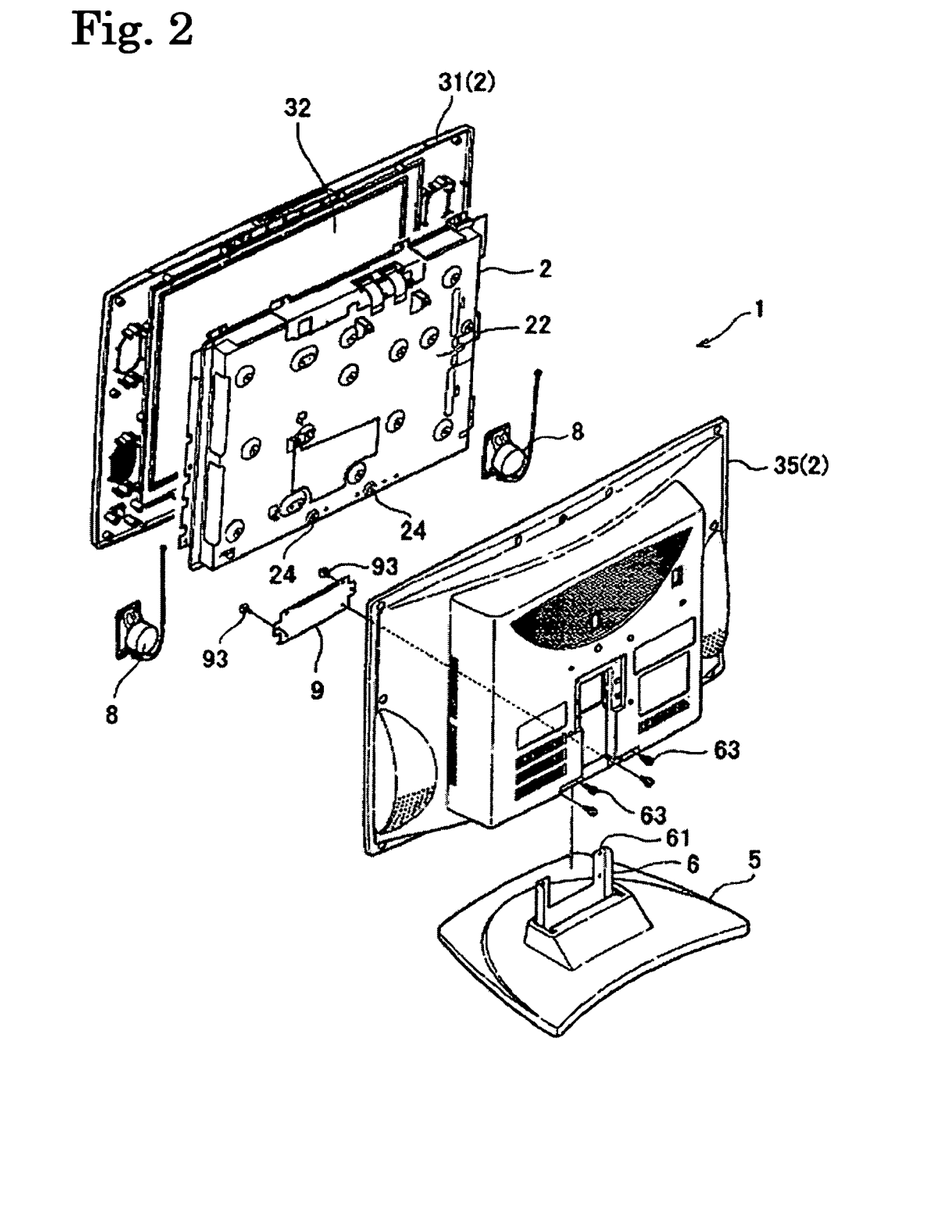
FIG. 2 is an exploded oblique view of the main constituent elements in an embodiment of this liquid crystal display device.
Figure 3:
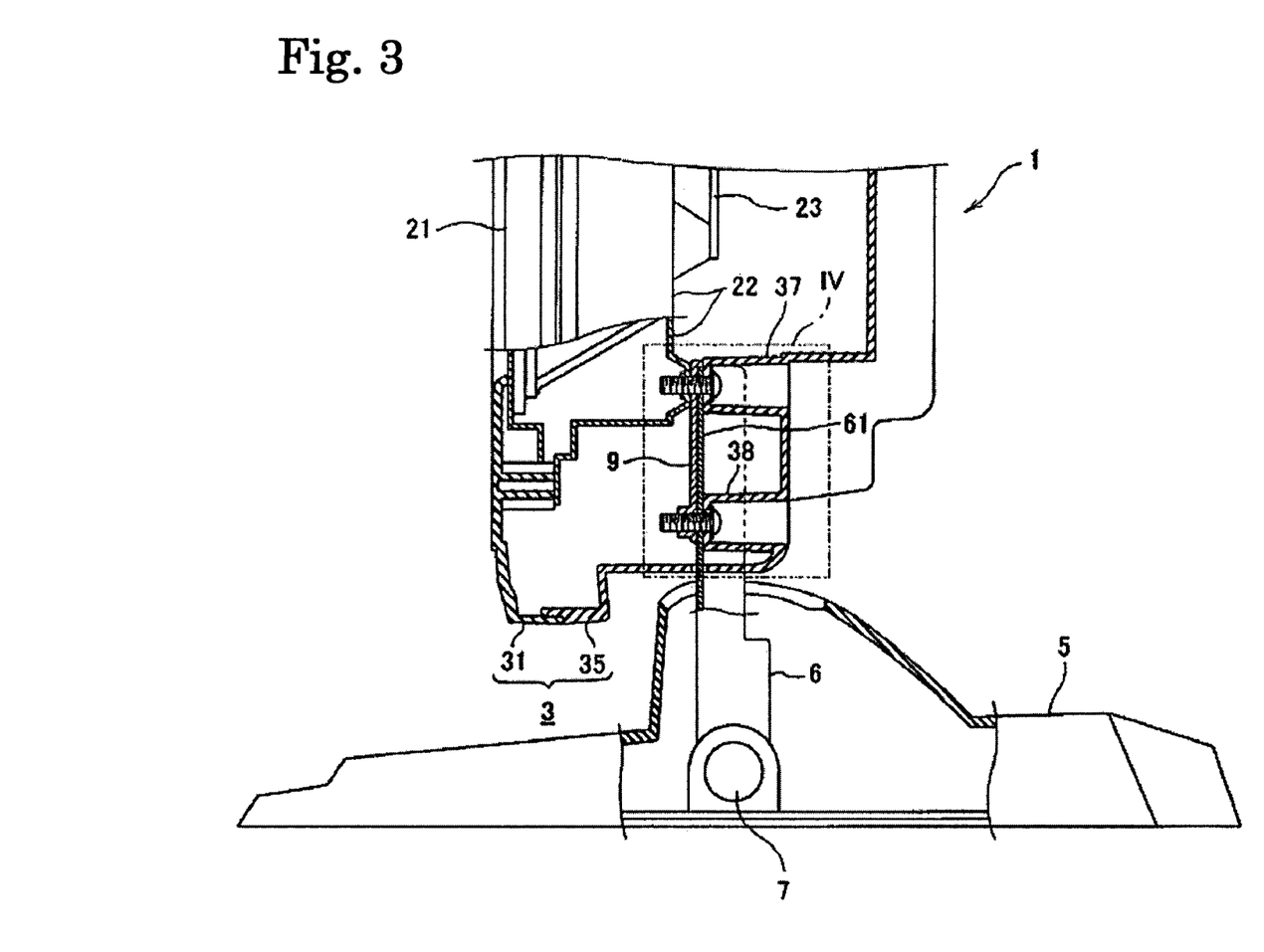
FIG. 3 is a cut-away side view of the main components of this liquid crystal display device.
Figure 4:
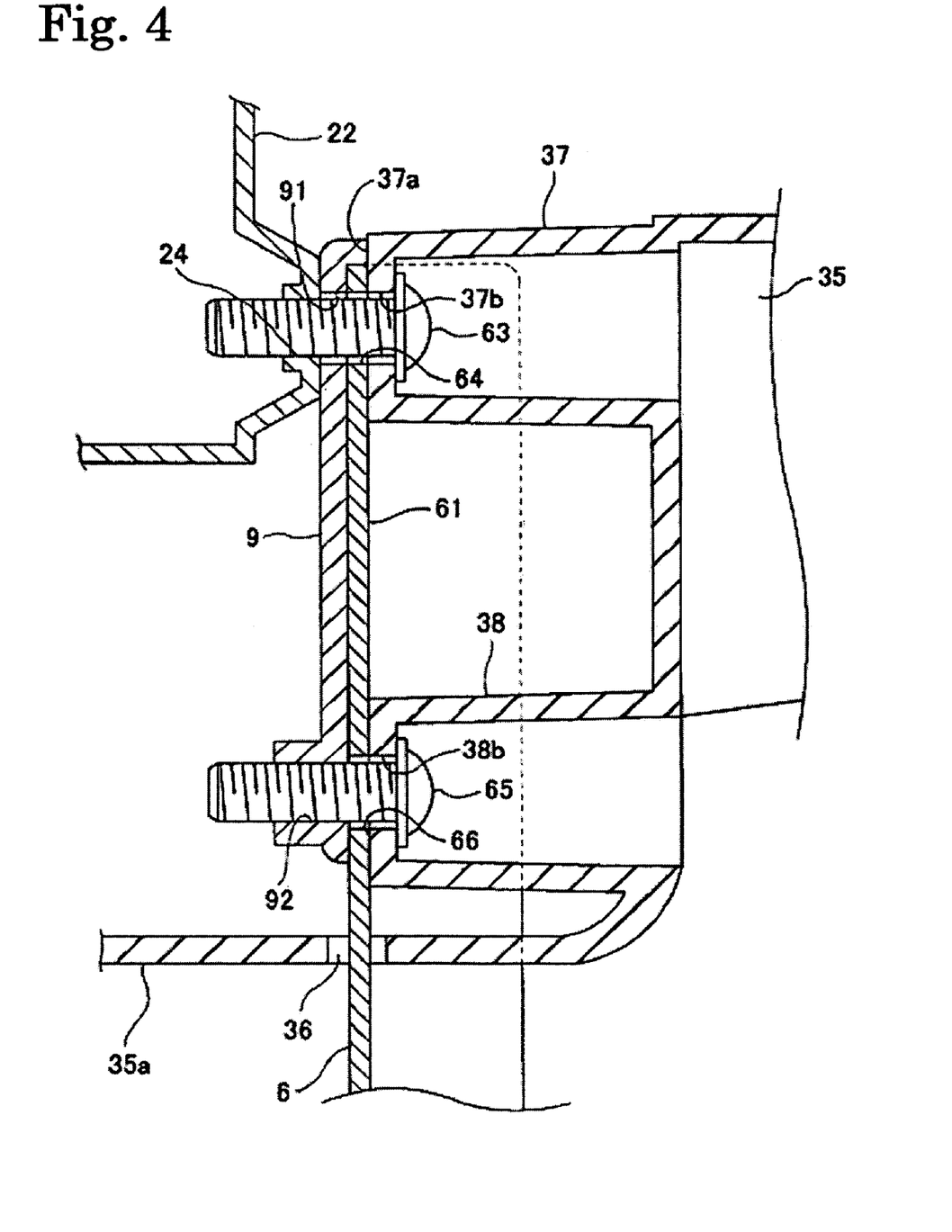
FIG. 4 is a detail view of the IV portion in FIG. 3.

FIGS. 1A and 1B are simplified side views illustrating the operation of the liquid crystal display device of the present invention, FIG. 2 is an exploded oblique view of the main constituent elements in an embodiment, FIG. 3 is a cut-away side view of the main components of this liquid crystal display device, and FIG. 4 is a detail view of the IV portion in FIG. 3.

With the liquid crystal display device shown in FIG. 1, the support leg 6, which is made of sheet metal, rises straight up from the base 5 via the lateral shaft 7, the support leg 6 is inserted from below into the flat cabinet 3, and the attachment component 61 at the upper end of this support-leg 6 is fastened by screws to the outer back face of the metal plate 22 of the liquid crystal module 2 inside the cabinet 3. 63 is an attachment screw. The constitution of the liquid crystal module 2 and the cabinet 3 is the same as that described through reference to FIGS. 5A and 5B, and the same components are numbered the same and will not be described in detail again.

With this liquid crystal display device, because the liquid crystal module 2 is heavy, the center of gravity G of the main unit 1 is located within the space occupied by the liquid crystal module 2, but since the attachment component 61 at the upper end of the support leg 6 is attached to the outer back face of the metal plate 22 corresponding to the outer back face of the liquid crystal module 2, the attachment site thereof is closer to the location of the center of gravity G in the horizontal direction than in the case of FIG. 5, and the weight of the main unit 1 is borne by the support leg 6. Accordingly, when the main unit 1 is in an upright orientation, the lateral shaft 7 for attaching the support leg 6 to the base 5 is located directly under or substantially directly under the center of gravity G of the main unit 1 as shown in FIG. 1A, and this minimizes the forward-falling load applied to the main unit 1 or the support leg 6 and attributable to the load (weight) F applied to the center of gravity G, and thereby helps make the main unit 1 less likely to swing, and also helps eliminate the danger that the main unit 1 will droop forward in a high-temperature test or the like. Also, when the tilt is adjusted as shown in FIG. 1B so that the main unit 1 is put in a forward-tilted orientation, or when it is put in a rearward-tilted orientation (leaning back; not shown), the location of the center of gravity G will move forward or backward, and the center of gravity G will move away from the lateral shaft 7 in the horizontal direction, but even in this case the center of gravity G will not move far from the lateral shaft 7 in the horizontal direction as shown in FIG. 5B, so the base will be stably seated even if the lengthwise width L of the base 5 disposed below the entire region of displacement of the center of gravity G in tilt adjustment is set shorter than the lengthwise width L1 shown in FIG. 5B. Therefore, setting the lengthwise width L of the base 5 to be shorter than in the case of FIG. 5 means that less installation space will be needed, and furthermore, packaging and the like can be more compact and transportation costs can be kept lower.

A specific embodiment will now be described through reference to FIGS. 2 to 4.

As shown in FIG. 2, the support leg 6 is attached to the base 5 so that it can incline forward or backward, allowing tilt adjustment. The main unit 1, meanwhile, houses a liquid crystal module 2 that is held by a front cover 31 inside a flat cabinet 3 formed by putting a rear cover 35 together with the front cover 31, in which a window 32 is formed, and also houses other required parts such as speakers 8 or a control board (not shown). The liquid crystal module 2 is equipped with a liquid crystal panel 21 (see FIG. 3), a backlight unit (not shown), a metal plate 22 that surrounds the back and sides of the liquid crystal panel 21 and prevents electromagnetic interference (EMI), and so forth. A control board 23 (see FIG. 3) is attached to the outer back face side of the metal plate 22.

As shown in FIGS. 3 and 4, the support leg 6 is inserted into the cabinet 3 from an opening 36 formed in the lower sheet portion 35a of a the rear cover 35. A sheet 9 made of sheet metal is sandwiched between an attachment component 61 at the upper end of the support leg 6 and the lower end of the outer back face of the metal plate 22, and the top face 37a of a boss 37 protruding inward from the back wall of the rear cover 35 is overlapped with the attachment component 61 of the support leg, and the overlapping portion is fastened with screws at two places on the left and right. In FIG. 4, 63 is an attachment screw, 37b, 64, and 91 are screw insertion holes, and 24 is a screw hole formed by burring in a conical protrusion formed in the metal plate 22. The sheet 9 sticks out downward, and the attachment component 61 is sandwiched between the lower end of this sheet 9 and another boss 38 protruding inward from the back wall of the rear cover 35, and is fastened with screws at two places on the left and right. In FIG. 4, 65 is an attachment screw, 38b and 66 are screw insertion holes, and 92 is a screw hole formed by burring. As can be seen from FIG. 2, the sheet 9 here is fastened by screws to the rear cover 35 at two places on the left and right using attachment screws 93.

When the support leg 6 is attached to the metal plate 22 and the rear cover 35 via the sheet 9 with the above structure, the weight of the main unit 1 is borne by the two attachment screws 65 on the lower side and the two attachment screws 63 on the upper side. A load that is divided between the rear cover 35 and the metal plate 22 is applied to the two attachment screws 63 on the upper side, and a load that is divided between the sheet 9 and the rear cover 35 is applied to the two attachment screws 65 on the lower side, so the application of load to just the metal plate 22 is suppressed, and since the shape of the metal plate 22 preserved by the sheet 9, a thinner sheet metal can be used for the metal plate 22 to prevent electromagnetic interference (EMI), without the metal plate 22 becoming deformed at the screw fastening sites.

With this embodiment, since the metal plate 22 of the liquid crystal module 2 is electrically connected to the attachment component 61 via the sheet 9 and the attachment screws 63, static electricity from the support leg 6 or the attachment screws 62 is prevented from discharging to the control board and generating an unintended short-circuit.

With the attachment structure of the main unit 1 and the support leg 6 described through reference to FIGS. 2 to 4, the shape of the metal plate 22 is preserved by interposing the sheet 9 between the metal plate 22 and the attachment component 61 of the support leg 6, but it is also possible to eliminate this sheet 9 and directly fasten the attachment component 61 of the support leg 6 with screws to the metal plate 22.

What is claimed is:

1. A liquid crystal display device comprising:
a main unit including
a liquid crystal module having a liquid crystal panel and an outer back face that includes a metal plate covering a back of the liquid crystal panel,
a flat cabinet housing the liquid crystal module with a center of gravity of the main unit being located within a space occupied by the liquid crystal module, the cabinet including a back wall with first and second bosses that protrude inward from the back wall of the cabinet, and
a sheet made of sheet metal and fastened by first and second screws to the cabinet;

a base; and
a support leg extending from the base to support the liquid crystal module, the support leg being formed in straight and made of metal,
the support leg including an attachment component that is overlapped with and fastened by the first screws to the outer back face of the liquid crystal module,
the sheet being sandwiched between the attachment component and the outer back face of the liquid crystal module and sticking out downward,
a top face of the first boss of the cabinet being overlapped with the attachment component of the support leg,
the attachment component and the sheet being sandwiched between the first boss and the outer back face of the liquid crystal module and being fastened by the first screws at two places on the left and right,
a top face of the second boss of the cabinet being overlapped with a lower end of the sheet, the support leg being sandwiched between the second boss and the sheet and being fastened by the second screws at two places on the left and right,
a lower end of the support leg being attached to the base so as to allow adjustment of a tilt of the support leg around a lateral shaft,
the base being disposed below the entire region of displacement of the center of gravity in a lengthwise direction accompanying the adjustment of the tilt of the support leg, and
a lengthwise width of the base being greater than a lengthwise width of the entire region of the displacement.

2. A liquid crystal display device comprising:
a main unit including
a liquid crystal module equipped with a liquid crystal panel, and
a flat cabinet housing the liquid crystal module with a center of gravity of the main unit being located within a space occupied by the liquid crystal module;
a base;
a support leg extending from the base to support the liquid crystal module, the support leg including an attachment component attached to an outer back face of the liquid crystal module on an inside of the cabinet, the attachment component including attachment portions with through holes, with the attachment portions of the attachment component being sandwiched between the liquid crystal module and the cabinet and being fastened to both the liquid crystal module and the cabinet by first screws such that the attachment portions of the attachment component directly contact with an inner face of the cabinet at locations around the through holes of the attachment component; and
a sheet disposed between the attachment portions of the attachment component and the outer back face of the liquid crystal module, and the sheet being fastened to the liquid crystal module by the first screws along with the attachment portion of the attachment component.

3. The liquid crystal display device according to claim 2, wherein
the outer back face of the liquid crystal module includes a metal plate covering a back of the liquid crystal panel, and the attachment component of the support leg, which is straight and made of metal, is overlapped with and fastened by the first screws to the outer back face of the liquid crystal module.

4. The liquid crystal display device according to claim 2, wherein a lower end of the support leg is attached to the base so as to allow adjustment of a tilt of the support leg around a lateral shaft.

5. The liquid crystal display device according to claim 4, wherein the base is disposed below the entire region of displacement of the center of gravity in a lengthwise direction accompanying the adjustment of the tilt of the support leg, and a lengthwise width of the base is set to be greater than a lengthwise width of the entire region of the displacement.

6. A liquid crystal display device comprising:

a main unit including a liquid crystal module having a liquid crystal panel and an outer back face that includes a metal plate covering a back of the liquid crystal panel, and a flat cabinet housing the liquid crystal module with a center of gravity of the main unit being located within a space occupied by the liquid crystal module, the cabinet including a back wall with a first boss that protrudes inward from the back wall of the cabinet;

a base;

a support leg extending from the base to support the liquid crystal module, the support leg including an attachment component attached to the outer back face of the liquid crystal module on an inside of the cabinet, the support leg being formed in straight and made of metal, a top face of the first boss being overlapped with the attachment component of the support leg, the attachment component being overlapped with and fastened by first screws to the outer back face of the liquid crystal module, the attachment component being sandwiched and fastened by the first screws between the first boss and the outer back face of the liquid crystal module; and a sheet made of sheet metal, and the sheet being sandwiched between the attachment component and the outer back face of the liquid crystal module and fastened by the first screws along with the attachment component.

7. The liquid crystal display device according to claim 6, wherein the sheet sticks out downward, a top face of a second boss protruding inward from the back wall of the cabinet is overlapped with a lower end of the sheet, and the support leg is sandwiched and fastened by second screws between the second boss and the sheet.

* * * * *